(12) United States Patent
Colborn

(10) Patent No.: US 6,841,276 B2
(45) Date of Patent: *Jan. 11, 2005

(54) METHOD OF AND SYSTEM FOR COOLING A BACKUP POWER SYSTEM

(75) Inventor: Jeffrey A. Colborn, Cardiff by the Sea, CA (US)

(73) Assignee: Metallic Power, Inc., Carlsbad, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 10/085,477

(22) Filed: Feb. 26, 2002

(65) Prior Publication Data

US 2003/0162064 A1 Aug. 28, 2003

(51) Int. Cl.[7] .............................................. H01M 8/00
(52) U.S. Cl. .............................. 429/12; 429/17; 429/24
(58) Field of Search ............................... 429/12, 17, 24

(56) References Cited

U.S. PATENT DOCUMENTS 6,673,482 B2 * 1/2004 Imazeki et al. ............... 429/26
6,692,852 B2 * 2/2004 Yang ............................ 429/20

* cited by examiner

Primary Examiner—Dah-Wei Yuan
(74) Attorney, Agent, or Firm—Howrey Simon Arnold & White, LLP

(57) ABSTRACT

A system of and method for cooling a backup power system upon or after the occurrence of a power outage or reduction condition is provided. Upon or after the occurrence of the power outage or reduction condition, the backup power system powers the cooling system. The cooling system, in turn, cools the backup power system and a substantially enclosed space.

18 Claims, 3 Drawing Sheets

METHOD OF AND SYSTEM FOR COOLING A BACKUP POWER SYSTEM

RELATED APPLICATIONS

This application is related to U.S. patent application Ser. No. 09/627,742, entitled "System And Method For Power Management," filed Jul. 28, 2000; U.S. patent application Ser. No. 09/930,557, entitled "Power System Including Heat Removal Unit For Providing Backup Power To One Or More Loads," filed Aug. 15, 2001; U.S. patent application Ser. No. 09/930,394, entitled "Metal Fuel Cell System For Providing Backup Power To One Or More Loads," filed Aug. 15, 2001; U.S. Provisional Application No. 60/318,685, entitled "Ultra-Long Duration Backup For Critical Applications Using Zinc/Air Regenerative Fuel Cells," filed Sep. 10, 2001; U.S. Provisional Application No. 60/328,838, entitled "Ultra-Long Duration Backup For Telecommunications Applications Using Zinc/Air Regenerative Fuel Cells," filed Oct. 11, 2001; and U.S. patent application Ser. No. To Be Determined, "Methods Of Using Fuel Cell System Configured To Provide Power To One Or More Loads," filed Oct. 19, 2001. Each of the foregoing applications is hereby fully incorporated herein by reference as though set forth in full.

1. Field of the Inventions

This invention relates generally to backup power systems, and, more specifically, to fuel cells or batteries configured to function as backup power systems, methods of or systems for cooling backup power systems after activation thereof, and methods of and systems for cooling a backup power system and a substantially enclosed space.

2. Related Art

Upon or after the occurrence of a power outage or reduction condition, a backup power system may be activated to power one or more loads. Frequently, however, no provision is made for cooling the backup power system upon or after its activation. Consequently, the backup power system can become overheated, which reduces its effectiveness. In addition, the backup power system, upon or after activation, may generate excessive heat which interferes with the operation of the one or more loads.

SUMMARY

The invention provides a system for cooling a backup power system and a substantially enclosed space upon or after the occurrence of a power outage or reduction condition. The system comprises a heat rejection system and an air cooling system. Forward and reverse flow paths are provided for the passage of a heat transfer fluid between the heat rejection system and the air cooling system. Similarly, forward and reverse flow paths are provided for the passage of the heat transfer fluid between the air cooling system and the backup power system.

The heat rejection and air cooling systems are powered by the backup power system upon or after the occurrence of a power outage or reduction condition. Similarly, one or more additional loads may be powered by the backup power system upon or after the occurrence of a power outage or reduction condition.

The backup power system, the heat rejection system, and the air cooling system may each be within or without the substantially enclosed space. Furthermore, the backup power system, the heat rejection system, and the air cooling system may each be packaged separately, or in combination with one or both of the others.

In one implementation, when activated, the heat rejection system receives a heat transfer fluid from a flow path originating at the backup power system, rejects heat from the heat transfer fluid and expels it into the environment outside the substantially enclosed space, and passes the resultant heat transfer fluid to the air cooling system. The air cooling system receives air from within or without the substantially enclosed space, cools this air using the heat transfer fluid, expels the cooled air within the substantially enclosed space, and passes the heat transfer fluid to the backup power system.

The heat transfer fluid circulates through the backup power system and cools it. The heat transfer fluid, after circulation through the backup power system, is returned to the heat rejection system.

This cycle may then repeat itself one or more times in continuous, semi-continuous, intermittent, or one-shot modes of operation.

In one implementation, the heat rejection system contains a compressor and the air cooling system contains an evaporator. In this implementation, the heat rejection system functions by compressing the heat transfer fluid to high pressure. The compressed heat transfer fluid gives off heat, which is expelled into the atmosphere outside the substantially enclosed space. The heat transfer fluid may condense from a gas phase to a liquid phase during compression.

The air cooling system in this implementation functions by allowing the heat transfer fluid to expand and thereby cool the surrounding air. As this occurs, the heat transfer fluid may evaporate from a liquid phase to a gas phase. In one configuration, the heat rejection system is situated outside the substantially enclosed space, while the backup power and air cooling systems are situated within the substantially enclosed space. Similarly, in one configuration, suitable for sensitive applications such as telecommunications enclosures and computer rooms, the air cooling system is configured to receive return air from within the substantially enclosed space.

The backup power system may be any electrochemical power system including but not limited to fuel cells, fuel cell systems, or batteries. Some examples of the fuel cells which are possible include zinc or hydrogen fuel cells. Some examples of the batteries which are possible include lead-acid, lithium-ion, lithium-polymer electrolyte, nickel-cadmium, nickel-metal-hydride, zinc-air, zinc-bromine, nickel-hydrogen, aluminum-air, magnesium-air, and metal-air.

The invention also provides a method of cooling a backup power system and a substantially enclosed space upon or after the occurrence of a power outage or reduction condition. According to this method, upon or after the occurrence of a power outage or reduction condition, a cooling system is powered by a backup power system. Next, the cooling system is used to cool the substantially enclosed space, and also the backup power system.

In one implementation, the cooling system comprises a heat rejection system and an air cooling system. In one implementation example, the heat rejection system contains a compressor and the air cooling system contains an evaporator.

In one configuration, the backup power system is a fuel cell or fuel cell system. In another configuration, the backup power system is a battery or battery system.

The invention also provides a backup power system for powering a cooling system upon or after a power outage or reduction condition. The system comprises an electrochemical power system, and a flow path for heat transfer fluid from the cooling system through the electrochemical power system to a return path.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

As utilized herein, terms such as "about" and "substantially" are intended to allow some leeway in mathematical exactness to account for tolerances that are acceptable in the trade, e.g., any deviation upward or downward from the value modified by "about" or "substantially" by any value in the range(s) from 1% to 20% of such value.

As employed herein, the terms or phrases "in the range (s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

Figure 1:
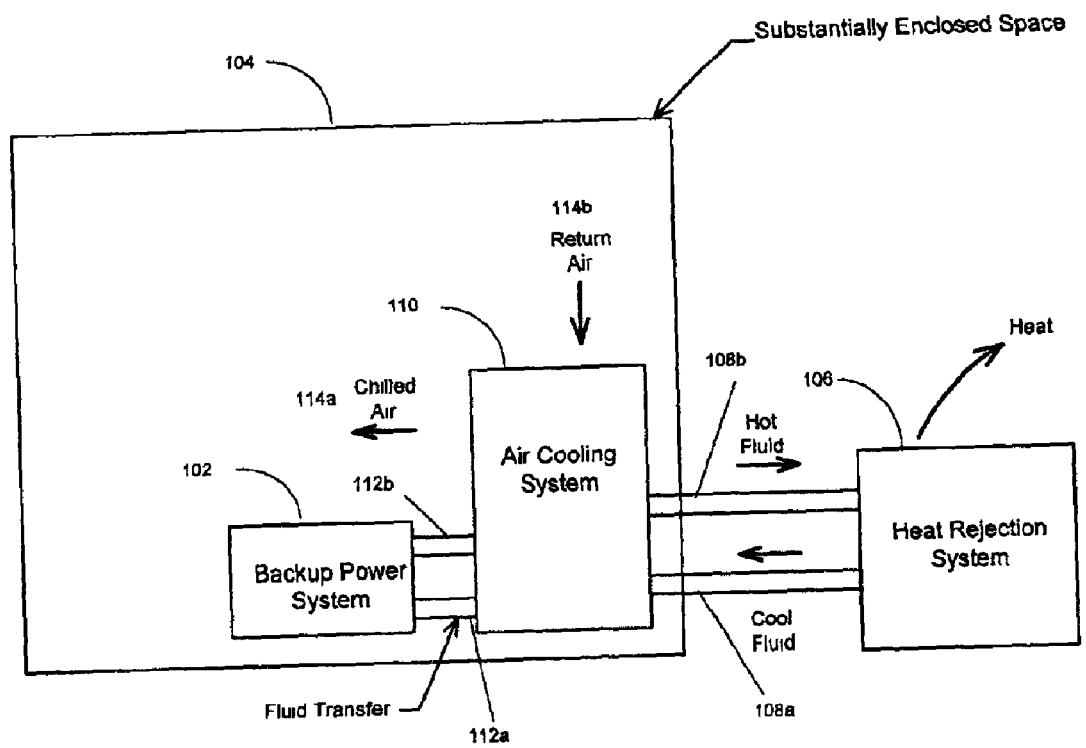
FIG. 1 is a simplified block diagram of one embodiment of a system for cooling a backup power system, the cooling system comprising a heat rejection system and an air cooling system.

Referring to FIG. 1, an embodiment of a system for cooling a backup power system 102 and a substantially enclosed space 104 upon or after the occurrence of a power outage or reduction condition is illustrated. The substantially enclosed space 104 need not be completely enclosed but it should at least be substantially enclosed, i.e., sufficiently enclosed to substantially reduce or eliminate heat transfer due to air convection between the interior and exterior of the substantially enclosed space. The system comprises a heat rejection system 106 and an air cooling system 110. Forward and reverse flow paths 108a, 108b are provided for the passage of a heat transfer fluid between the heat rejection system 106 and the air cooling system 110. Similarly, forward and reverse flow paths 112a, 112b are provided for the passage of the heat transfer fluid between the air cooling system 110 and the backup power system 102.

The heat rejection and air cooling systems 106, 110 are powered by the backup power system 102 upon or after the occurrence of a power outage or reduction condition. Similarly, one or more additional loads within or without the substantially enclosed space 104 may be powered by the backup power system 102 upon or after the occurrence of a power outage or reduction condition.

The backup power system 102, the heat rejection system 106, and the air cooling system 110 may each be within or without the substantially enclosed space 104.

When activated, the heat rejection system 106 receives a heat transfer fluid from a flow path 112b, 108b originating at the backup power system 102, rejects heat from the heat transfer fluid and expels it into the environment outside the substantially enclosed space 104, and passes the resultant heat transfer fluid to the air cooling system 110 through flow path 108a. The air cooling system 110 receives air from within or without the substantially enclosed space 104, which air is identified with numeral 114b, cools this air using the heat transfer fluid, and expels the cooled air within the substantially enclosed space 104, which cooled air is identified by numeral 114a. Air cooling system 110 then passes the heat transfer fluid to the backup power system 102 through flow path 112a.

The heat transfer fluid circulates through the backup power system 102 and cools it. The heat transfer fluid, after circulation through the backup power system 102, is returned to the heat rejection system 106 through flow paths 112b, 108b.

This cycle may then repeat itself one or more times in continuous, semi-continuous, intermittent, or one-shot modes of operation.

In one implementation, the heat rejection system 106 contains a compressor and the air cooling system 110 contains an evaporator. In this implementation, the heat rejection system functions by compressing the heat transfer fluid to high pressure. The compressed heat transfer fluid gives off heat, which is expelled into the atmosphere outside the substantially enclosed space 104.

The air cooling system 110 in this implementation functions by evaporating the heat transfer fluid. As it evaporates, the heat transfer fluid expands, and cools the surrounding air.

In one configuration, the heat rejection system 106 is situated outside the substantially enclosed space 104, while the backup power and air cooling systems 102, 110 are situated within the substantially enclosed space 104. Similarly, in one configuration, suitable for sensitive applications such as telecommunications enclosures and computer rooms, the air cooling system 110 can be configured to receive return air from within the substantially enclosed space 104.

The backup power system 102 may be any electrochemical power system including but not limited to fuel cells, fuel cell systems, or batteries. Some examples of the fuel cells which are possible include zinc or hydrogen fuel cells. Some examples of the batteries which are possible include lead-acid, lithium-ion, lithium-polymer electrolyte, nickel-cadmium, nickel-metal-hydride, zinc-air, zinc-bromine, nickel-hydrogen, aluminum-air, magnesium-air, and metal-air.

Figure 2A:
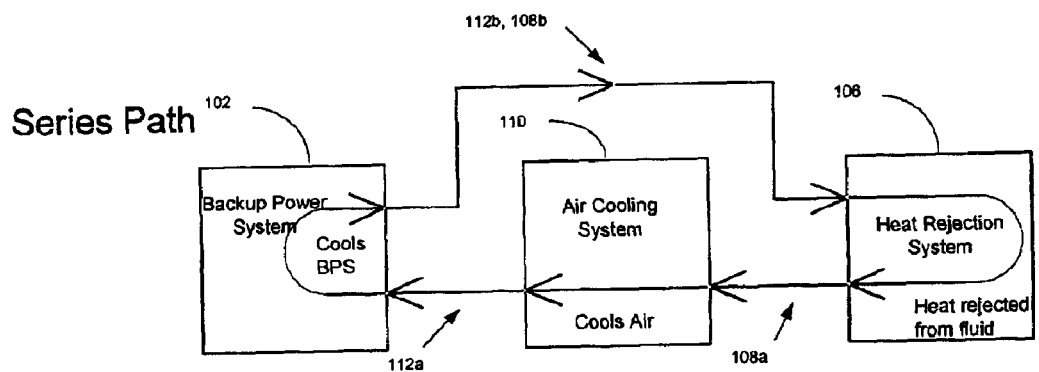
FIG. 2A is a simplified block diagram of one implementation of the cooling system of FIG. 1 in which the air cooling and backup power systems are in a series relationship.
Figure 2B:
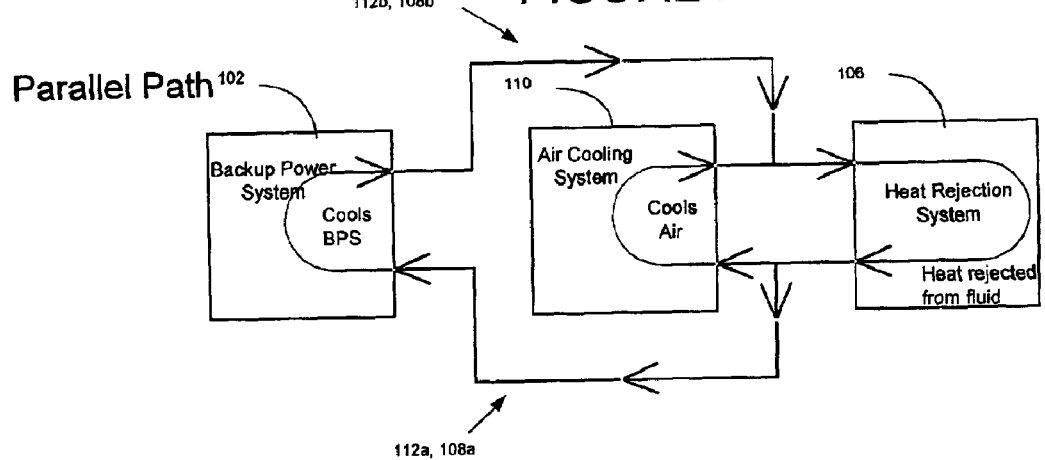
FIG. 2B is a simplified block diagram of one implementation of the cooling system of FIG. 1 in which the air cooling and backup power systems are in a parallel relationship.

The backup power system 102 and air cooling system 110 may be in a parallel or series arrangement in relation to the flow of heat transfer fluid from the heat rejection system 106. Referring to FIG. 2A, a series arrangement is illustrated in which the heat transfer fluid flows from heat rejection system 106 to air cooling system 110 and then from air cooling system 110 to backup power system 102. Referring to FIG. 2B, a parallel arrangement is illustrated in which the heat transfer fluid flows from heat rejection system 106 to air cooling system 110 and to backup power system 102 in parallel.

Figure 3:
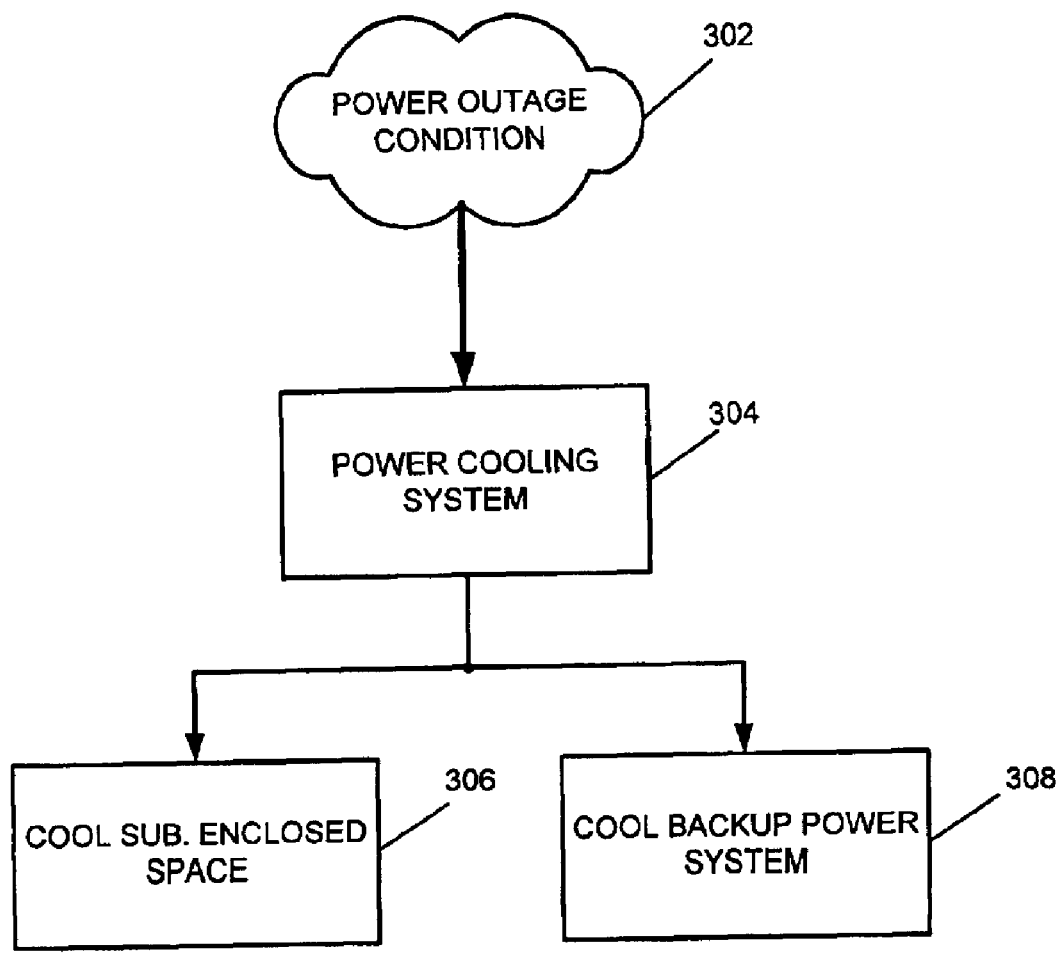
FIG. 3 is a simplified flowchart of one embodiment of a method of cooling a backup power system and a substantially enclosed space upon or after the occurrence of a power outage or reduction condition.

Referring to FIG. 3, an embodiment of a method of cooling a backup power system and a substantially enclosed space upon or after the occurrence of a power outage or reduction condition is illustrated. According to this method, upon or after the occurrence of a power outage or reduction condition, identified with numeral 302, step 304 is performed. In step 304, a cooling system is powered by a backup power system. Next, steps 306 and 308 are performed. In step 306, the cooling system is used to cool the substantially enclosed space. In step 308, the cooling system is used to cool the backup power system.

In one implementation, the cooling system comprises a heat rejection system and an air cooling system. In one implementation example, the heat rejection system contains a compressor and the air cooling system contains an evaporator.

In one configuration, the backup power system is a fuel cell or fuel cell system. In another configuration, the backup power system is a battery or battery system.

A further embodiment of the invention comprises a backup power system for powering a cooling system upon or after the occurrence of a power outage or reduction condition. The system comprises an electrochemical power system, and a flow path for heat transfer fluid from the cooling system through the electrochemical power system to a return path.

The electrochemical power system may be a fuel cell, a fuel cell system, a battery, or a battery system.

While various embodiments of the invention have been described, it will be apparent to those of ordinary skill in the art that many more embodiments and implementations are possible that are within the scope of this invention.

What is claimed is:

1. A method of cooling a backup power system and a substantially enclosed space upon or after the occurrence of a power outage or reduction condition comprising:

using a backup power system to power a cooling system upon or after the occurrence of a power outage or reduction condition; and using the cooling system to cool the backup power system and the substantially enclosed space upon or after the occurrence of a power outage or reduction condition.

2. The method of claim 1 wherein the cooling system comprises a heat rejection system and an air cooling system.

3. The method of claim 2 wherein the heat rejection system contains a compressor and the air cooling system contains an evaporator.

4. The method of claim 1 wherein the backup power system is an electrochemical power system.

5. The method of claim 4 wherein the electrochemical power system comprises a fuel cell or fuel cell system.

6. The method of claim 4 wherein the electrochemical power system comprises a battery or battery system.

7. The method of claim 2 wherein the heat rejection system is within the substantially enclosed space.

8. The method of claim 2 wherein the heat rejection system is outside the substantially enclosed space.

9. The method of claim 2 wherein the air cooling system is within the substantially enclosed space.

10. The method of claim 2 wherein the air cooling system cools air received from within the substantially enclosed space.

11. The method of claim 2 wherein the air cooling system cools air received from outside the substantially enclosed space.

12. The method of claim 2 wherein the air cooling and backup power systems are in a series relationship.

13. The method of claim 2 wherein the air cooling and backup power systems are in a parallel relationship.

14. The method of claim 1 wherein the backup power system is within the substantially enclosed space.

15. The method of claim 1 wherein the backup power system is outside the substantially enclosed space.

16. The method of claim 1 wherein the backup power system comprises an electrochemical power system.

17. The method of claim 1 wherein the backup power system comprises a fuel cell or fuel cell system.

18. The method of claim 1 wherein the backup power system comprises a battery or battery system.

* * * * *